June 23, 1925.　　　　　B. C. LECHLER　　　　　1,543,289
CENTRIFUGAL MACHINE
Filed Jan. 15, 1921　　　2 Sheets-Sheet 1
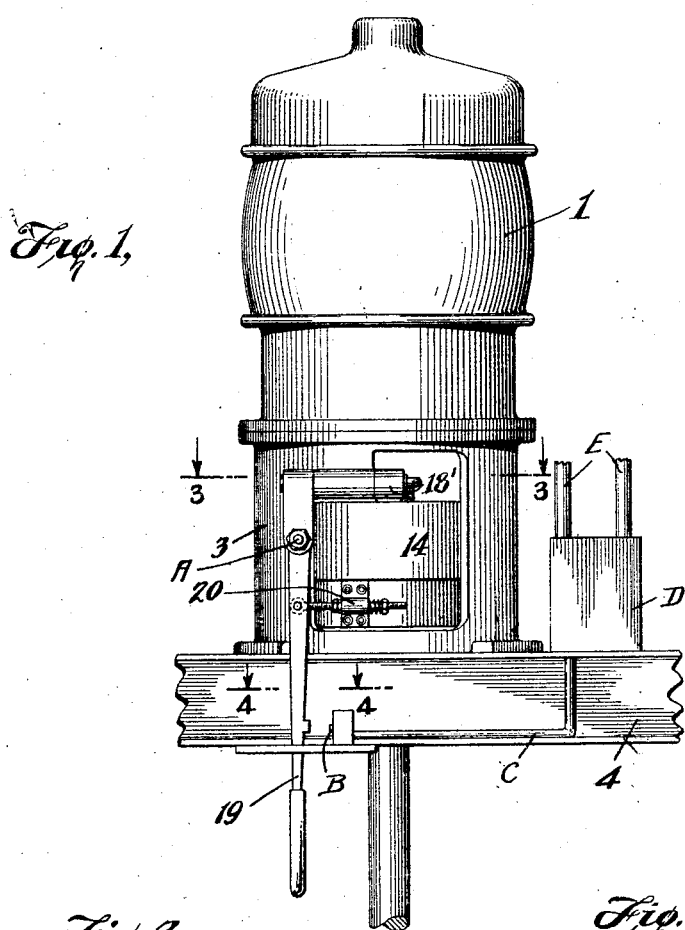
Fig. 1,
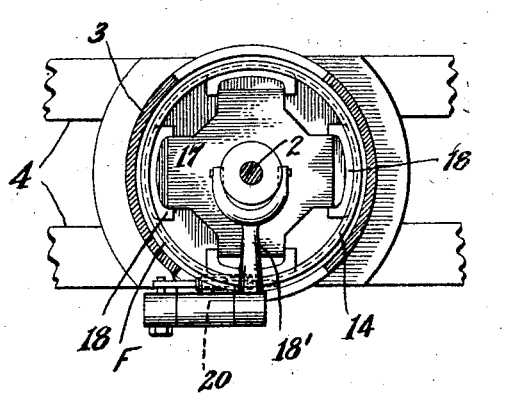
Fig. 3,
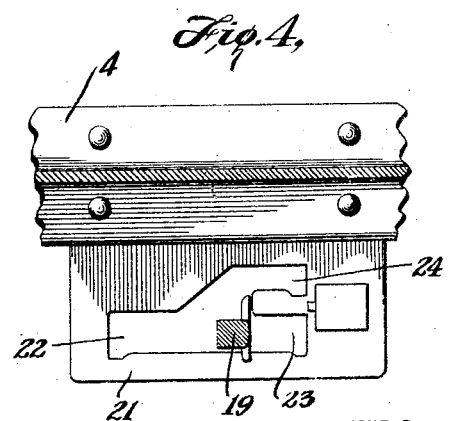
Fig. 4,
INVENTOR
Bruno C. Lechler.
BY
Riddle & Marquiron
ATTORNEYS June 23, 1925.

B. C. LECHLER

CENTRIFUGAL MACHINE

Filed Jan. 15, 1921

INVENTOR
Bruno C. Lechler.
BY
Kiddle & Margeson.
ATTORNEYS

Patented June 23, 1925.

1,543,289

UNITED STATES PATENT OFFICE.

BRUNO C. LECHLER, OF PHILADELPHIA, PENNSYLVANIA, ASSIGNOR OF ONE-HALF TO FLETCHER WORKS, INCORPORATED, OF PHILADELPHIA, PENNSYLVANIA, A CORPORATION OF PENNSYLVANIA.

CENTRIFUGAL MACHINE.

Application filed January 15, 1921. Serial No. 437,485.

*To all whom it may concern:*

Be it known that I, BRUNO C. LECHLER, a citizen of the United States, and a resident of Philadelphia, in the county of Philadelphia and Commonwealth of Pennsylvania, have invented certain new and useful Improvements in Centrifugal Machines, of which the following is a specification.

My invention relates to centrifugals and is particularly directed to drives for centrifugals used in drying crystals which crystals are unloaded by a mechanical scraper or discharger.

The centrifugal when performing the drying operation is driven at a very high rate of speed and when the discharger is employed for unloading the centrifugal the latter can be driven at a very slow speed only. The difference in speed is very great, the drying speed running as high as twelve hundred R. P. M. for example while the unloading speed may be only twenty R. P. M. It will be seen, therefore, that to achieve such variations in speed the driving spindle from which the centrifugal is driven must be capable of an extreme range of speed. This is exceedingly inconvenient when the power for driving the centrifugal is taken from a line shaft running at a fixed speed.

It has been customary heretofore to employ a common, hand-operated, friction clutch between the centrifugal and the driving means therefor such as a line shaft for example, and such a clutch when set to transmit the torque used in running the centrifugal at high speed can only be used to transmit the lower torque used in discharging the machine by partially engaging the clutch. A clutch employing blocks automatically thrown into frictional grip by the revolution of the drive shaft has also been employed where a discharger was not used with the machine but in such a case the machine need be driven only at one speed; such a clutch obviously could not be employed at all in connection with a discharger except where the speed of the driving shaft could be varied.

If a multi-speed motor were employed, such as a two-speed alternating motor running at say twelve hundred and six hundred R. P. M., only two torques could be transmitted in the ratio of one to four. The lower of these torques must necessarily equal the force required to overcome the unloader resistance. This fixes the accelerating force which might or might not be the one desired for the acceleration of the machine. The desirable rotation acceleration of the machine, of course, varies, some materials requiring that they be brought to speed gradually.

By the apparatus constituting the present invention I am able to drive a centrifugal at widely varying speeds from a driver running at a substantially constant speed, a frictional clutch being employed which is capable of adjustment to transmit varying torques which are mutually independent in value, the clutch slipping at either torque as desired.

In the accompanying drawings I have illustrated several embodiments of my invention:

Fig. 1 and Fig. 2 show a preferred form of my invention in elevation and part sectional elevation;

Fig. 3 is a section taken on the line 3—3 of Fig. 1; and

Fig. 4 is a section taken on the line 4—4 of Fig. 1.

Figure 2:
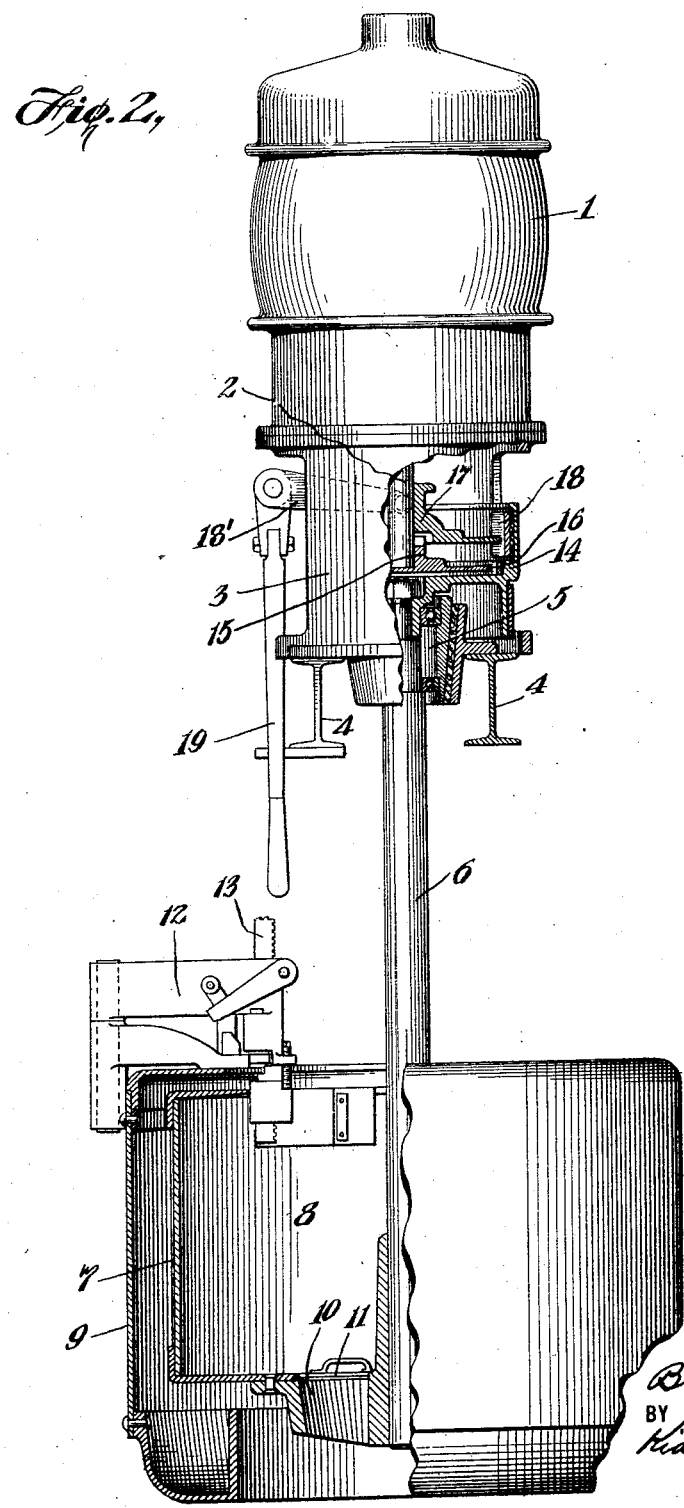

Referring to the drawings in detail 1 indicates a constant speed electric motor deriving its current from any suitable source of power, this motor being provided with a drive shaft 2. Immediately below the motor is a clutch housing 3 in which is provided the clutch mechanism to be described later. The clutch housing and motor are supported on suitable supports 4 and in line with the drive shaft 2 of the motor 1 and mounted in bearings 5 in the clutch housing 3 is a shaft 6 upon which is mounted a centrifugal 7. This centrifugal is of usual type comprising the centrifugal proper 8 and a casing 9 surrounding the same, the centrifugal being provided with a discharge opening 10 leading to the exterior of the casing 9 and controlled by a cover or closure 11 whereby material such as sugar crystals may be discharged from the centrifugal as desired. The centrifugal is provided with an unloader or plough designated 12 and operable into and out of unloading position by a rack 13. Inasmuch as the particular construction of the centrifugal and the unloading device form no part of the present invention the same will not be described in detail.

It is the purpose of this invention to provide means intermediate the centrifugal 7 and the motor 1 whereby the centrifugal may be driven at unloading speed which is very slow or at high speed for example twelve hundred R. P. M., the torque transmitted from the motor 1 to the centrifugal being variable. To this end, therefore, I provide within the housing 3 the clutch mechanism illustrated in sectional elevation in Fig. 2 and in section in Fig. 3. This clutch mechanism comprises a drum 14 keyed to the shaft 6 of the centrifugal. Mounted upon the armature shaft 2 of the motor 1 which is the drive shaft I provide a sleeve 15 keyed thereto, this sleeve controlling a series of centrifugal blocks 16 which are adapted to be thrown outwardly by centrifugal force into frictional engagement with the inside of the drum 14 to cause the same to be rotated thereby driving the shaft 6 and centrifugal 7. Immediately above the sleeve 15 I provide an additional sleeve 17 slidable upon but not keyed to the armature shaft 2 of the motor. This sleeve carries a series of centrifugally operated blocks 18 which are also adapted to be thrown outwardly by centrifugal force into frictional engagement with the drum 14. The sleeve 17 is connected to a lever 18' adapted to be operated by a controlling level 19, the latter being so constructed and arranged as to control not only the clutch mechanism now being described but also the circuit for the motor 1. From Fig. 1 it will be seen that the lever 19 is pivoted at A and when swung about this pivot to the right as viewed in Fig. 1, is brought into contact with the push button B controlling a solenoid switch in the case D through conductors contained in the conduit C. The operation of the push button B closes a circuit to the solenoid switch to thereby close the motor circuit through the main feed wires contained in the conduits E. The sleeve 17 is adapted to be moved vertically with respect to the drive shaft 2 by manipulation of the controlling lever 19 into and out of engagement with the sleeve 15 so that by proper manipulation of the controlling lever 19 the sleeve 17 and the sleeve 15 may be brought into such relation as to cause the blocks 16 and 18 to drive the drum 14 and thereby drive the shaft 6 of the centrifugal 7 or the sleeve 15 together with the blocks 16 controlled thereby may drive the drum 14 as desired.

In addition the control lever 19 is connected to a brake mechanism designated 20 and shown more or less diagrammatically whereby a brake may be applied, this brake mechanism being so arranged that movement of the control lever to one position will apply the brake and at the same time open the motor circuit.

The brake 20 comprises a brake band F anchored at one end, the other end being connected to the lever 19 so that as this lever moves away from the push button B the brake band F will be wrapped about the brake drum on the spindle.

The various positions which may be assumed by the control lever 19 are shown in Fig. 4 wherein it will be seen that the control lever extends through a slotted member 21, movement of the control lever to the end 22 of the slot applying the brake while movement of the lever into the slot 23 closes the motor circuit and at the same time adjusts the clutch mechanism, and movement of the lever to the slot 24 closes the motor circuit and at the same time adjusts the clutch for an additional setting of the clutch.

In operation the control lever 19 is moved into the slot 23 to close the circuit of the motor 1 and at the same time move the sleeve 17 downwardly with respect to the sleeve 15 whereby the two sleeves will be operatively connected and the torque transmitted from the prime mover, to wit: the electric motor 1 to the centrifugal 7 will be transmitted from the drive shaft 2 through the blocks 18 and 16 and the drum 14 to the shaft 6 of the centrifugal. The motor will accelerate and bring the centrifugal 7 up to the desired speed which may be for example twelve hundred R. P. M. After the centrifugal has been rotated for a sufficient length of time which is a variable, depending upon the material being treated, the controlling lever 19 is actuated so as to assume a position in the slot 22 of Fig. 4. This opens the circuit of the motor 1 and applies the brake and brings the entire mechanism to rest including both the motor and the centrifugal.

The control lever 19 is then manipulated into the slot 24 to move the sleeve 17 out of engagement with the sleeve 15 so that the torque will be transmitted from the prime mover 1 to the shaft 6 through the sleeve 15 and the blocks 16 by way of the drum 14. As soon as the centrifugal has reached an unloading speed, say about twenty R. P. M., the attendant draws the unloader 12 into the material whereby a resistance to movement of the centrifugal is generated equalling the torque transmitted by the clutch at this setting of the control lever 19. As the result of this the centrifugal will continue to rotate at say twenty R. P. M. without acquiring additional speed but the motor 1 will speed up to the same speed as before which may be say for example twelve hundred R. P. M.

The blocks 16 and 18 and the sleeves 15 and 17 are so proportioned that when the centrifugal is running as a centrifugal, the torque transmitted from the prime mover through the sleeves 15 and 17 and the blocks 16 and 18 is sufficient to cause the centrifugal to run at the same speed as the prime mover but when the clutch is adjusted and the unloader is brought into operation the speed of the centrifugal is kept to say twenty R. P. M. while the motor is allowed to accelerate to full speed as before.

The speed of acceleration of the centrifugal 7 is variable depending upon the material being treated and likewise the unloading speed may be variable for the same reason and to this end, therefore, the blocks 16 and 18 have been provided so that they may be substituted by other blocks if desired to change the proportion of one set of blocks relatively to the other so that the torque transmitted by the prime mover at driving and unloading speeds may be varied to suit such conditions.

It will be seen, therefore, that I have provided a centrifugal which is adapted to be driven from a prime mover at variable speeds, the prime mover, however, always running at a constant speed; furthermore, that I have provided a centrifugal clutch adapted to be interposed between a prime mover and a driven part which is capable of transmitting a plurality of torques which may be varied while the clutch is in motion.

It will be seen from the foregoing that I have provided an apparatus wherein a centrifugal or the like is capable of being driven at varying speeds from a constant speed prime mover. It will be seen also that I have provided an apparatus wherein a centrifugal friction clutch is employed intermediate the prime mover and the driven part which clutch is capable of transmitting a plurality of torques from the prime mover to the driven part which torques may be varied at will and while the device is in operation.

It is to be understood that while I have described specific details of construction the same may be varied within the purview of my invention.

What I claim is:

1. In combination, a constant-speed prime mover, a centrifugal, a clutch intermediate the prime mover and centrifugal, an unloader, said clutch comprising two members movable relatively to each other, a centrifugally operated member carried by each of said clutch members and means for controlling the position of one clutch member relatively to the other whereby the torque transmitted by the centrifugally operated members from the prime mover to the centrifugal will be varied to drive the centrifugal at one time at the same speed as the prime mover and at another time at an unloading speed due to the drag of the unloader.

2. In combination, a constant-speed prime mover, a clutch housing, a support for said prime mover and clutch housing, a centrifugal, an unloader, a centrifugal shaft, a bearing for said centrifugal shaft on the said clutch housing, a drum rigidly secured to said centrifugal shaft, a drive shaft extending into said clutch housing, a clutch member keyed to said shaft and cooperating with said drum whereby torque is transmitted from the prime mover to the centrifugal, a second clutch member slidable relatively to said armature shaft, and means for moving said last-named clutch member into engagement with the first-named clutch member to cause the torque transmitted from the prime mover to the centrifugal to be varied to drive the centrifugal at one time at the same speed as the prime mover and at another time at an unloading speed due to the drag of the unloader.

This specification signed this 14 day of January, 1921.

BRUNO C. LECHLER.